United States Patent [19]

Duga

[11] Patent Number: 4,723,982
[45] Date of Patent: Feb. 9, 1988

[54] GOB DISTRIBUTOR

[75] Inventor: Robert J. Duga, Enfield, Conn.

[73] Assignee: Emhart Industries, Inc., Farmington, Conn.

[21] Appl. No.: 18,214

[22] Filed: Feb. 24, 1987

[51] Int. Cl.[4] .................................................. C03B 7/20
[52] U.S. Cl. ....................................... 65/225; 65/164; 65/304
[58] Field of Search ................. 65/159, 164, 165, 171, 65/225, 304

[56] References Cited

U.S. PATENT DOCUMENTS 3,775,083  11/1973  Nebelung et al. ..................... 65/225
4,599,101  7/1986  Douglas et al. ..................... 65/225 X Primary Examiner—Arthur Kellogg
Attorney, Agent, or Firm—Spencer T. Smith

[57] ABSTRACT

A gob distributor comprising a head including at least one gob scoop having a pinion and a rack for interconnecting with the pinion so that the gob scoop can be rotatively displaced through a predetermined angular range including an intermediate location whereat the scoop is parallel to the rack. The gob scoop can be displaced by structure which includes a ball screw, a nut, a housing, and a carriage secured to the nut. The carriage has an upstanding arm, and is located at a selected location by the operation of first and second opposed single acting cylinders which are mounted on the ball screw housing with the rods thereof intersect the upstanding arm. The rods advance to a fully advanced position locating the upstanding arm at the selected location with the gob scoop at the neutral position.

4 Claims, 3 Drawing Figures

GOB DISTRIBUTOR

The present invention relates to mechanisms for distributing glass gobs received from a gob feeder to a trough assembly which feeds discrete glassware forming stations.

Gob distributors include a head which usually has a plurality of gob scoops mounted for rotative displacement. Gobs are fed to these glassware forming stations in accordance with a predetermined program. At the conclusion of machine operation the head is displaced away from its operative position so that any gobs thereafter directed to the gob distributor will miss the distributor and fall directly down into a suitable gob catching chute which will deliver the gobs to a safe area.

If the gob scoops have the wrong orientation when this happens these scoops may strike the trough assembly preventing its complete clearance from below the gob feeder. In such event gobs later inadvertently fed to the distributor may be mishandled by the distributor instead of falling to the intended safe area.

It is accordingly an object of the present invention to rotatively displace the scoops to a neutral position below the gob distributor assembly whenever machine power is cut off so that the desired displacement of the assembly to its inoperative location can take place.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings.

Figure 2:
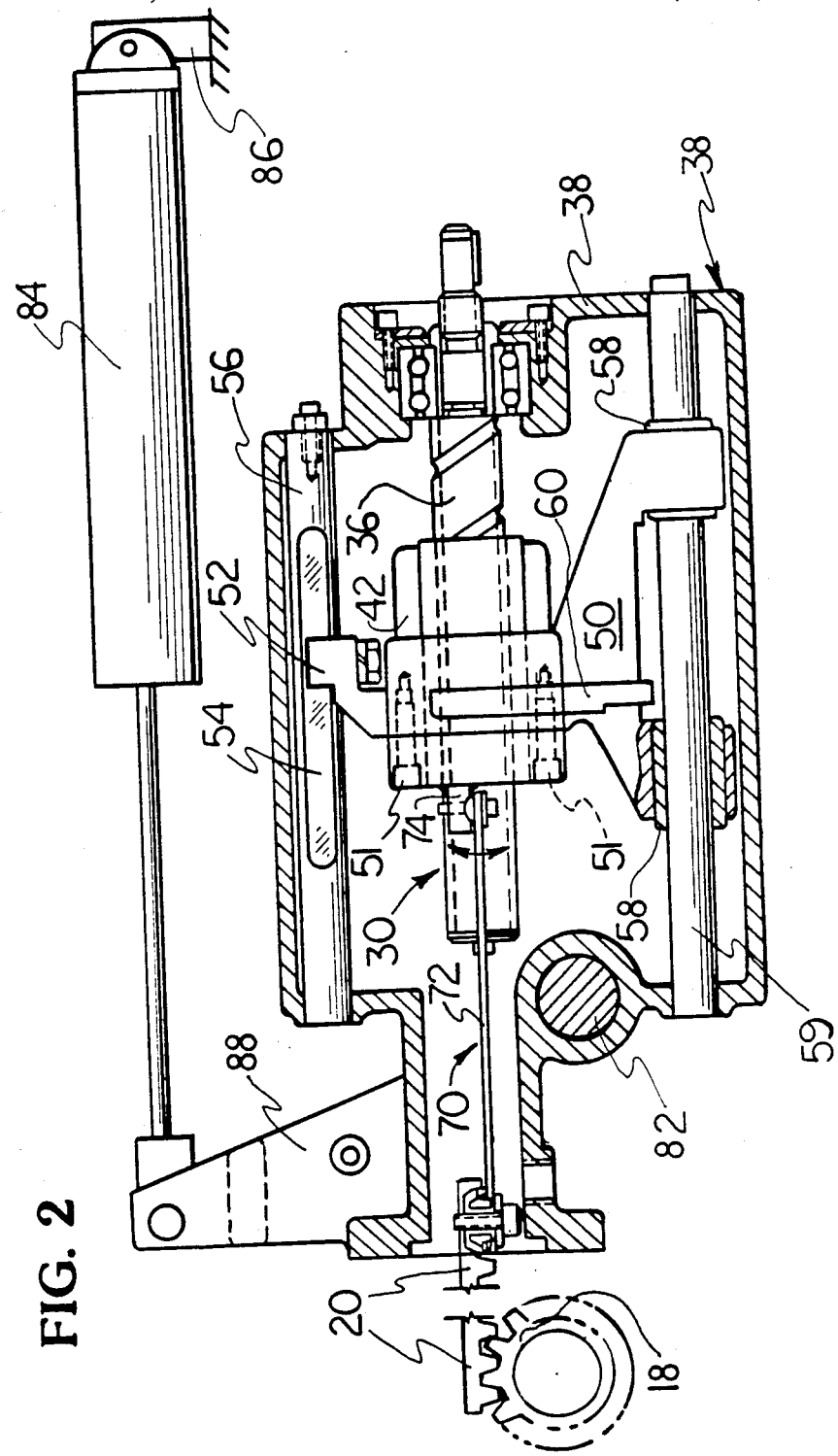
FIG. 2 is a view looking downwardly into the lower casting of the ball screw housing.

The gob distributor includes a head 10 which has a housing 12 supporting a number of gob scoops 14. These scoops 14 receive and redirect gobs to a fixed array of troughs (not shown) which feed discrete glassware forming stations. The housing also supports a corresponding number of gob receiving ends 16 which receive gobs from a gob feeder and guide these gobs to the scoops 14. As illustrated in FIG. 2, each gob scoop 14 has a pinion 18 which interconnects with a rack 20 so that the gob scoops can be rotatively displaced in unison through a desired angular range by selective displacement of the rack.

Figure 1:
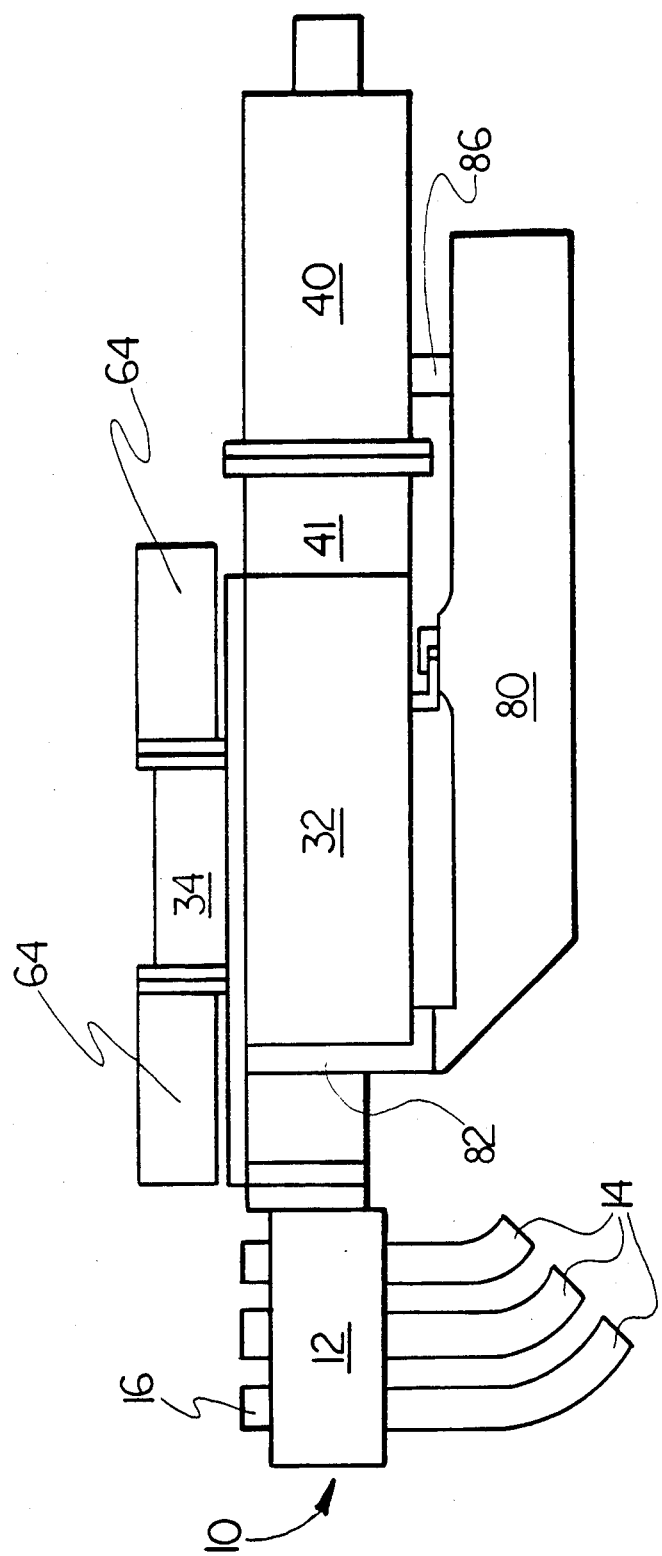
FIG. 1 is a side elevational view of a gob distributor made in accordance with the teachings of the present invention.

The displacement of the rack is controlled by a ball screw assembly 30 (FIG. 2) which is contained within a housing having upper 32 and lower 34 parts (FIG. 1). As shown in FIG. 2, a ball screw 36 is journalled into the right end wall 38 of the lower housing 34. Rotation of the ball screw 36 by a servo motor 40 via a coupling 41, advances or retracts a ball screw nut 42. To maintain this ball screw nut 42 at its desired orientation throughout its displacement a carriage 50 is secured to the ball screw nut 42 via bolts 51. The carriage 50 extends towards one side of the lower housing 34 and rotatably supports upper 52 and lower (not shown) rollers which ride on flats 54 (only the top flat is shown) defined on a support rod 56 extending between the ends of the lower housing 34. The carriage 50 also extends toward the other side of the lower housing 34 and supports a pair of axially spaced cylindrical bushings 58 which slide along a second rod 59. This rod 59 extends, parallel to the first rod 56, between the ends of the lower housing 34.

The ball screw nut 42 is connected via a coupling 70 to the rack 20. The coupling includes a link 72 which is secured at its right, end to nut brackets 74 and which is secured at its other end to the rack 20.

Figure 3:
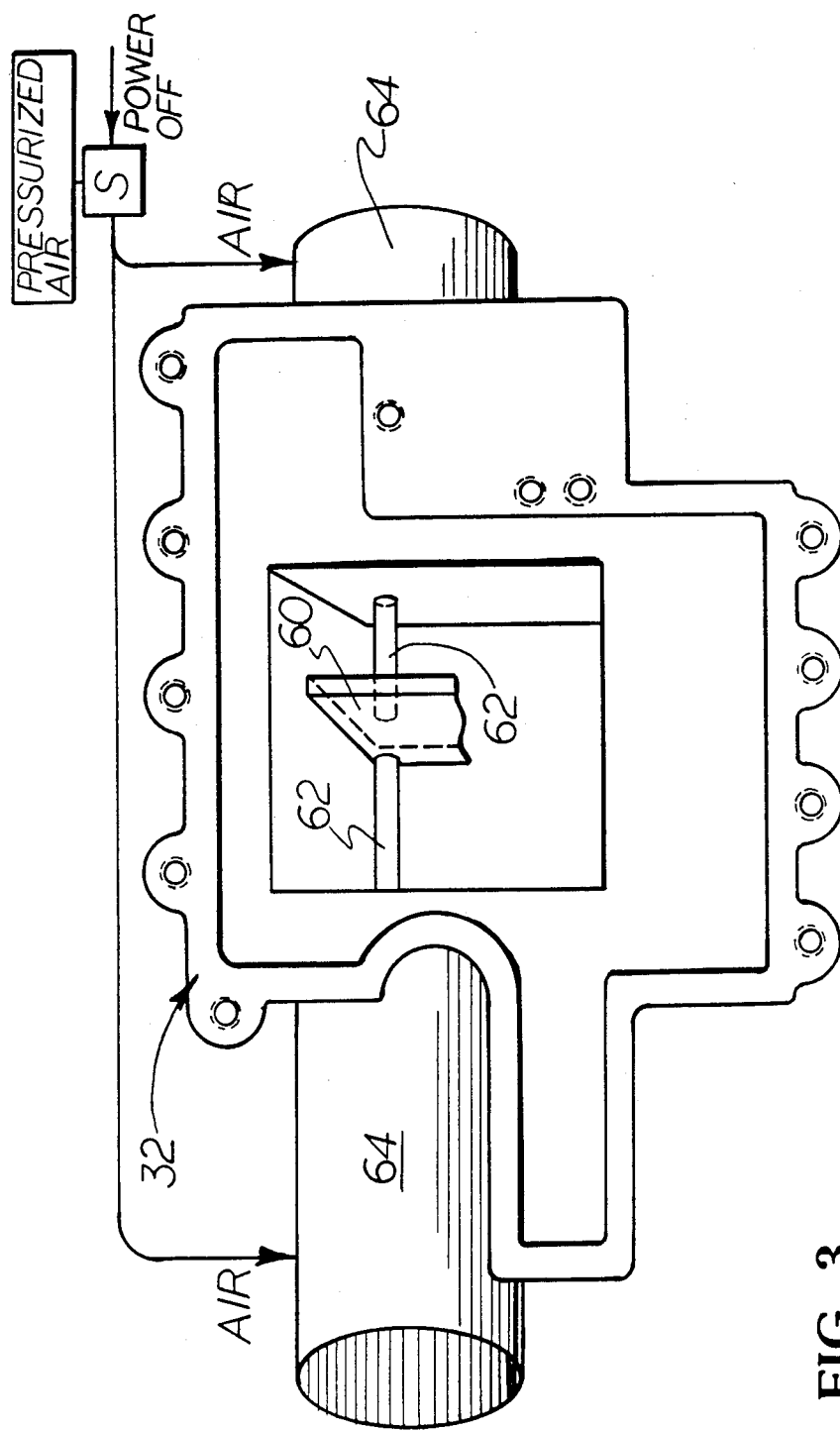
FIG. 3 is an oblique view looking upwardly into the upper casting of the ball screw housing.

As can be seen from FIG. 3, the carriage 50 also includes an arm 60 which projects upwardly into the upper housing 32 to intersect the axis of displacement of the rods 62 of opposed single acting air cylinders 64. The rods 62 extend through the end walls of the upper housing 32. The air cylinders 64 are normally not in communication with Pressurized Air so that as the carriage 50 is displaced between its advanced and retracted positions the arm 60 will force each of these rods 62 to a retracted position. When, however, the power to the machine is shut off either by intent or otherwise, or a power off signal is generated for any other reason, a control solenoid S will operate to connect the source of Pressurized Air to these air cylinders 64 thereby locating the arm between the fully advanced rods 62 (a small clearance will remain between one of the rods 62 and the centered arm 60). The gob scoops 14 will be in a neutral position, parallel to the rack 20 and beneath the housing 12 of the head 10 when this arm 60 is so centered.

The ball bearing housing is supported by a support bracket 80 for pivotal movement about a vertical shaft 82 and the entire gob distributor including the head 10, ball screw assembly 30 and the screw drive motor 40 and coupling 41, can be pivoted from an operative position to a remote position where the head will be removed from beneath the gob feeder, by operating the retract cylinder 84 which extends between a support bracket arm 86 and a lower housing arm 88.

I claim:

1. A gob distributor comprising
   a head including at least one gob scoop having a pinion and rack means for interconnecting with said pinion so that said gob scoop can be rotatively displaced through a predetermined angular range including an intermediate location whereat said scoop is parallel to said rack means.
   means for displacing said gob scoop to its neutral position including
      a ball screw,
      a ball screw nut,
      a ball screw housing,
      carriage means secured to said ball screw nut, and
   means secured to said ball screw housing for guiding the displacement of said carriage means,
   said carriage means having an upstanding arm, and
   means for locating said upstanding arm at a selected location including
      first and second opposed single acting cylinder means mounted on said ball screw housing so that the rods thereof intersect said upstanding arm, said rods being advanceable to a fully advanced position,
      said fully advanced position of said rods being selected so that said rods will locate said upstanding arm at a selected location locating said gob scoop at said neutral position.

2. A gob distributor according to claim 1, wherein each of said cylinder means is an air cylinder.

3. A gob distributor according to claim 1, wherein said head comprises a plurality of gob scoops.

4. A gob distributor according to claim 1, further comprising means for actuating said cylinder means whenever the power to the gob distributor is turned off.

* * * * *